United States Patent
Anderson et al.

(10) Patent No.: US 11,108,819 B2
(45) Date of Patent: Aug. 31, 2021

(54) PRIVACY ENHANCING MAN-IN-THE-MIDDLE

(71) Applicant: Cisco Technology, Inc., San Jose, CA (US)

(72) Inventors: Blake Harrell Anderson, Chapel Hill, NC (US); David McGrew, Poolesville, MD (US)

(73) Assignee: Cisco Technology, Inc., San Jose, CA (US)

( * ) Notice: Subject to any disclaimer, the term of this patent is extended or adjusted under 35 U.S.C. 154(b) by 143 days.

(21) Appl. No.: 16/594,203

(22) Filed: Oct. 7, 2019

(65) Prior Publication Data

US 2021/0105301 A1    Apr. 8, 2021

(51) Int. Cl.
*H04L 29/06* (2006.01)

(52) U.S. Cl.
CPC ...... *H04L 63/1466* (2013.01); *H04L 63/0485* (2013.01); *H04L 63/166* (2013.01); *H04L 63/30* (2013.01)

(58) Field of Classification Search
CPC ............. H04L 63/1466; H04L 63/0485; H04L 63/166; H04L 63/30
USPC ........................................................ 726/22
See application file for complete search history.

(56) References Cited

U.S. PATENT DOCUMENTS

| | | | |
|---|---|---|---|
| 8,555,053 B1 * | 10/2013 | Vitalo | G06F 13/382 |
| | | | 713/153 |
| 8,711,688 B1 | 4/2014 | Smith et al. | |
| 9,009,461 B2 | 4/2015 | Martini | |
| 9,973,516 B2 | 5/2018 | Seul et al. | |
| 10,171,250 B2 | 1/2019 | Adams | |
| 2015/0382034 A1 * | 12/2015 | Thangaraj | H04N 19/40 |
| | | | 709/231 |
| 2017/0346853 A1 | 11/2017 | Wyatt et al. | |

OTHER PUBLICATIONS

International Search Report dated Sep. 8, 2020 in connection with International Application No. PCT/US2020/038030.
Mike Perry, "Padding Negotiation", Retrieved from Internet: URL:https://gitlab.torproject.org/dgoulet/ torspec/-/blob/ ecbde01aaeda6e06e5736158100 e7 dfcf3c8887d/proposals/254-padding-negotiation.txt [retrieved on Aug. 28, 2020] sections 2 and 3, the whole document.
Mike Perry, 11 Padding for netflow record resolution reduction 11, 2' 0 Aug. 2015 (Aug. 20, 2015), XP055725803, Retrieved from the Internet: URL:https://gitweb.torproject.org/torspec. glt/tree/proposals/ 251-netflow-padding.txt [retrieved on Aug. 28, 2020], the whole document.

(Continued)

*Primary Examiner* — Michael S McNally
(74) *Attorney, Agent, or Firm* — Behmke Innovation Group LLC; Kenneth J. Heywood; Jonathon P. Western

(57) ABSTRACT

In one embodiment, a device in a network intercepts traffic sent from a first endpoint destined for a second endpoint. The device sends a padding request to the second endpoint indicative of a number of padding bytes. The device receives a padding response from the second endpoint, after sending the padding request to the second endpoint. The device adjusts the intercepted traffic based on the received padding response. The device sends the adjusted traffic to the second endpoint.

20 Claims, 8 Drawing Sheets

(56) References Cited

OTHER PUBLICATIONS

Liu Xing et al: 11 Selectiv e HTTPS traffic manipulation at middleboxes for BYOD devices 11, 2017 IEEE 25th International Conference on Network Protocols (ICNP), IEEE, Oct. 10, 2017 (Oct. 10, 2017), pp. 1-10, XP033262210, DOI: 10.1109/ICNP.2017.8117557 [retrieved on Nov. 21, 2017] section I section IV, last paragraph.
Sandra Siby et al: 11 Encrypted DNS →Privacy? A Traffic Analysis Perspecti ve 11 , arxiv.org, Cornell University Library, 201 Olin Library University Ithaca, NY 14853, Jun. 24, 2019 (Jun. 24, 2019), XP081379358, section 6, the whole document.

* cited by examiner

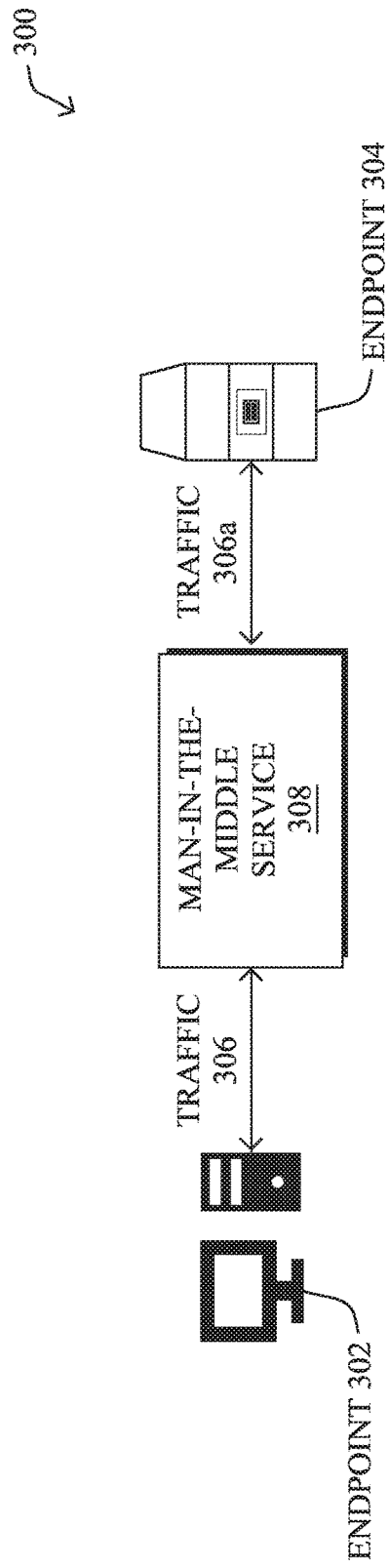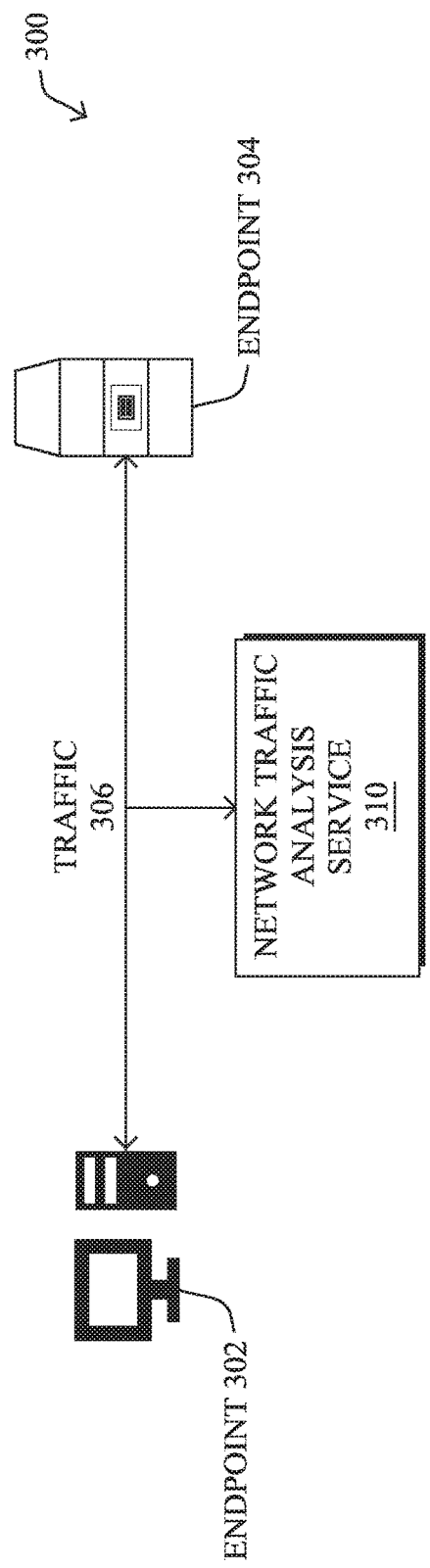

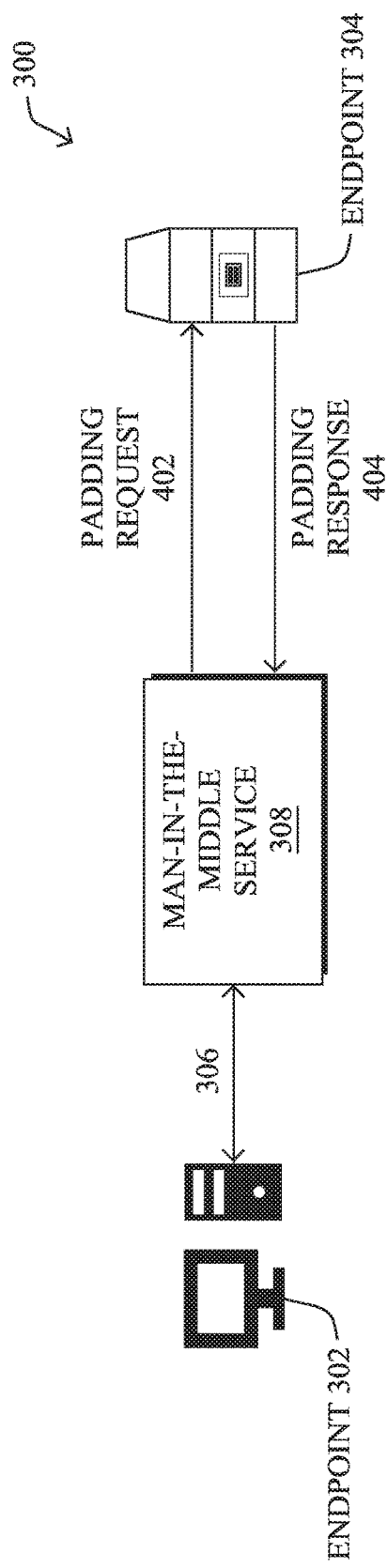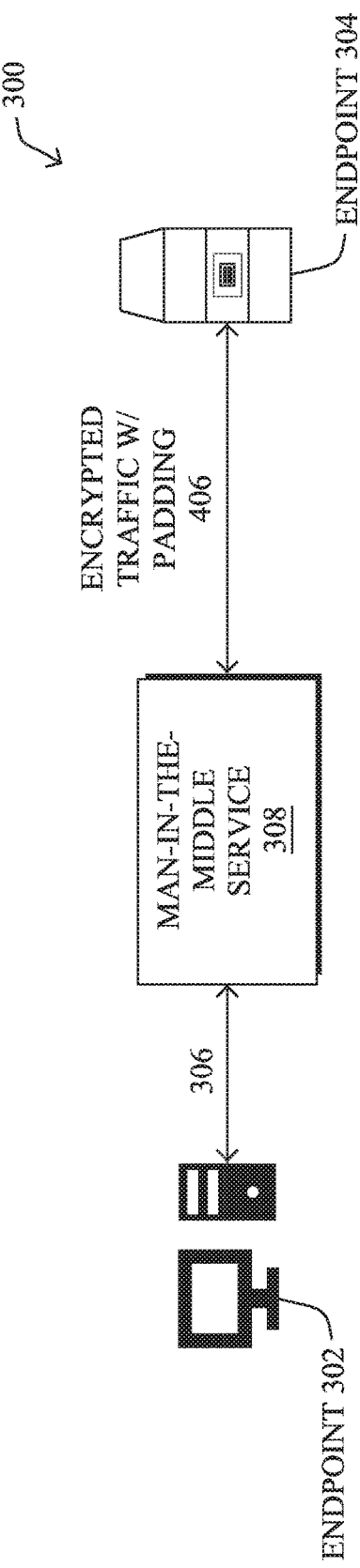

PRIVACY ENHANCING MAN-IN-THE-MIDDLE

TECHNICAL FIELD

The present disclosure relates generally to computer networks, and, more particularly, to a privacy enhancing man-in-the-middle.

BACKGROUND

Encrypted traffic is becoming increasingly ubiquitous in many computer networks. Indeed, recent studies estimate that almost three quarters of Internet traffic is now encrypted. However, the use of encryption in a network operates as a double-edged sword. On one hand, encryption can help preserve the privacy of sensitive information such as banking information, trade secrets, medical records, and the like. On the other hand, though, encryption can also be used to conceal malicious activities such as the proliferation of malware, data exfiltration, etc.

Recently, network traffic analysis (NTA) has evolved to assess encrypted traffic without actually decrypting the traffic. In general, these approaches use machine learning-based classification to infer fine-grained details about an encrypted session, based on the characteristics of the traffic (e.g., header information, byte size and timing information, etc.). For example, certain forms of malware generate encrypted traffic with very specific patterns that a properly trained classifier can identify. While these approaches are quite powerful from a security standpoint, they also present new privacy concerns, as they essentially defeat the purpose of using encryption to encrypt the traffic in the first place.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 3A-3B illustrate example approaches to assess encrypted network traffic;

FIGS. 4A-4C illustrate examples of a man-in-the-middle service ensuring traffic privacy;

DESCRIPTION OF EXAMPLE EMBODIMENTS

Overview

Figure 1A:
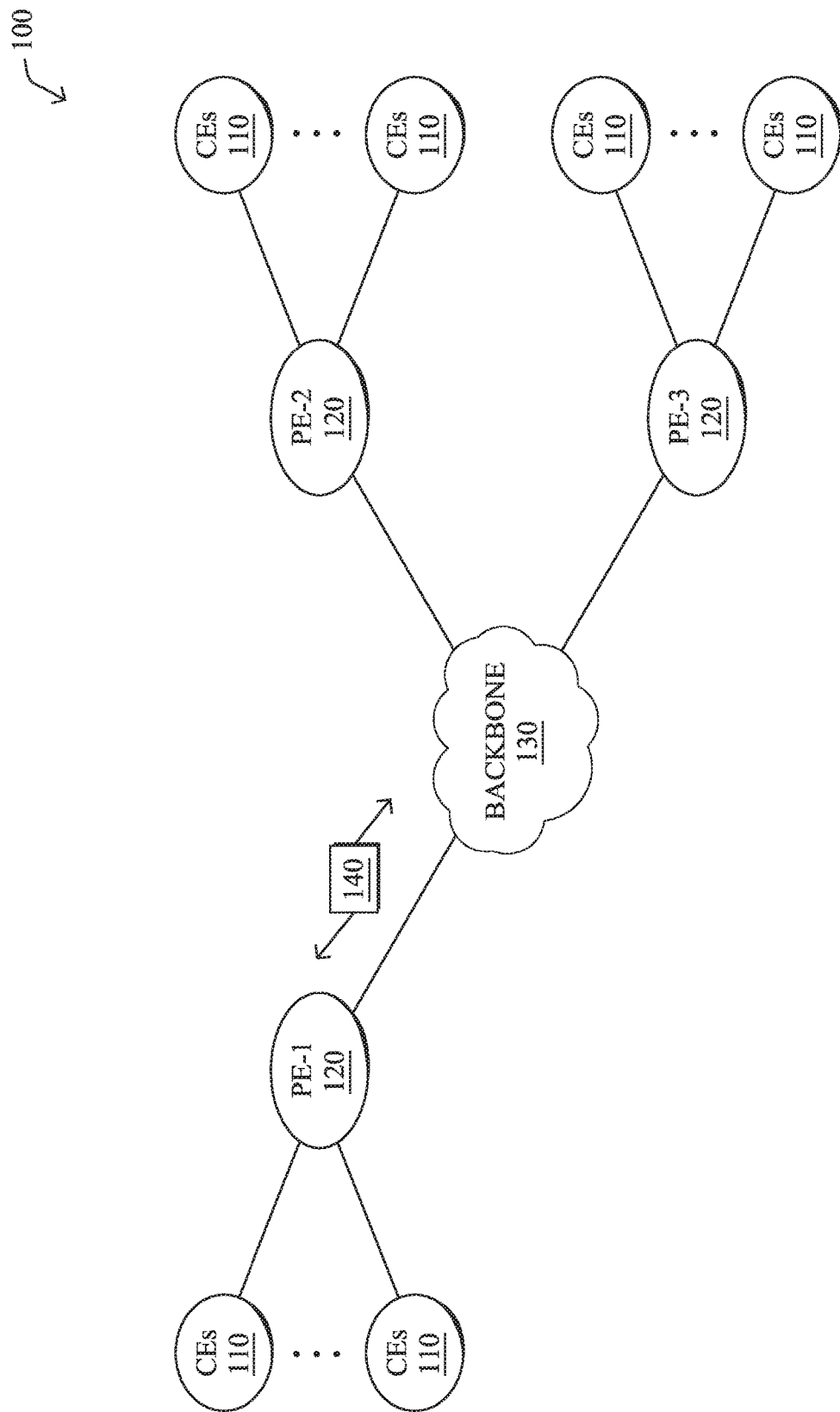
FIGS. 1A-1B illustrate an example computer network.

According to one or more embodiments of the disclosure, a device in a network intercepts traffic sent from a first endpoint destined for a second endpoint. The device sends a padding request to the second endpoint indicative of a number of padding bytes. The device receives a padding response from the second endpoint, after sending the padding request to the second endpoint. The device adjusts the intercepted traffic based on the received padding response. The device sends the adjusted traffic to the second endpoint.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links using a single CE router (e.g., from different service providers), with potentially a backup link (e.g., a 3G/4G/5G/LTE connection). A site of type B may itself be of different types:

2a.) Site Type B1: a site connected to the network using two MPLS VPN links (e.g., from different service providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
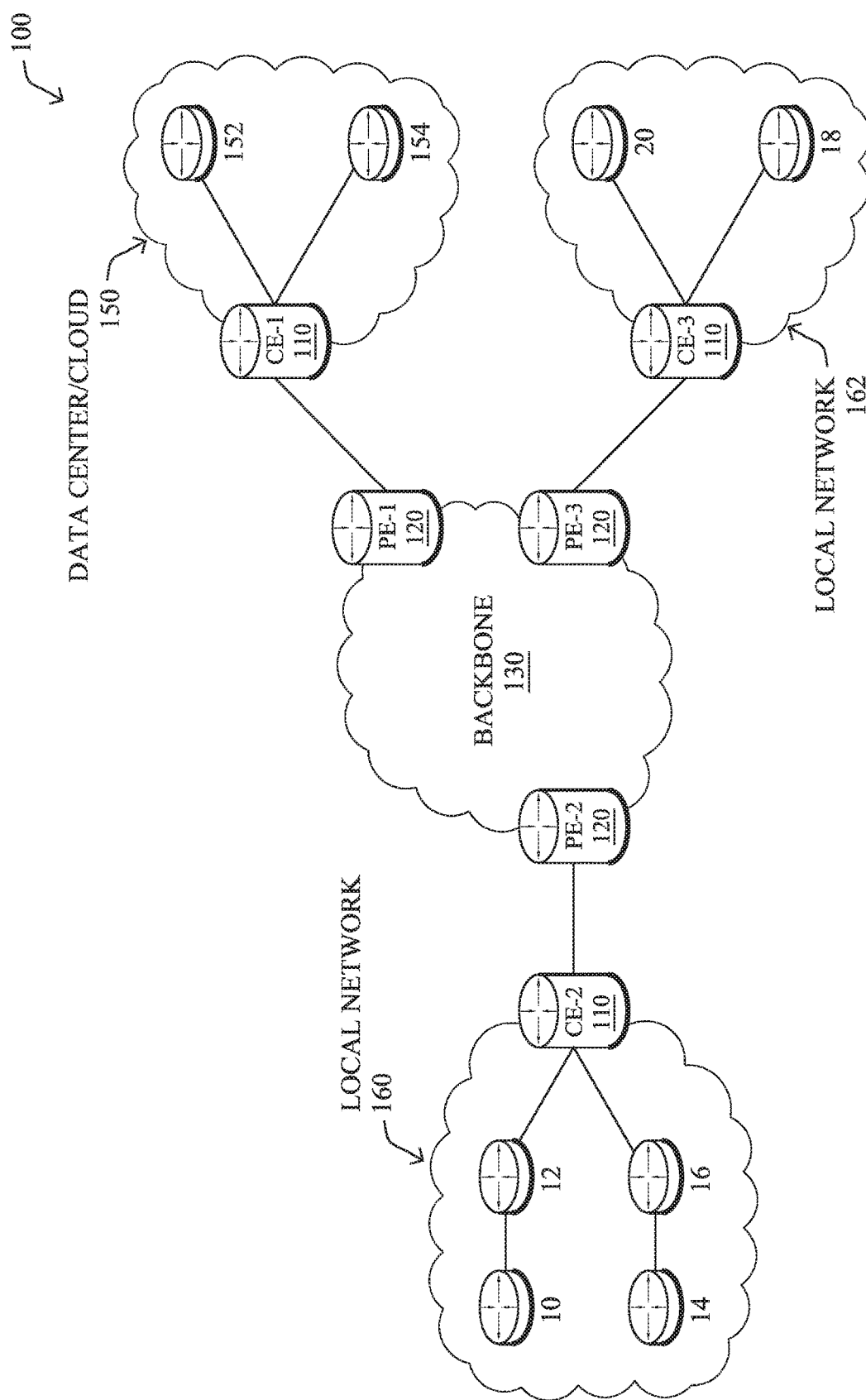

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
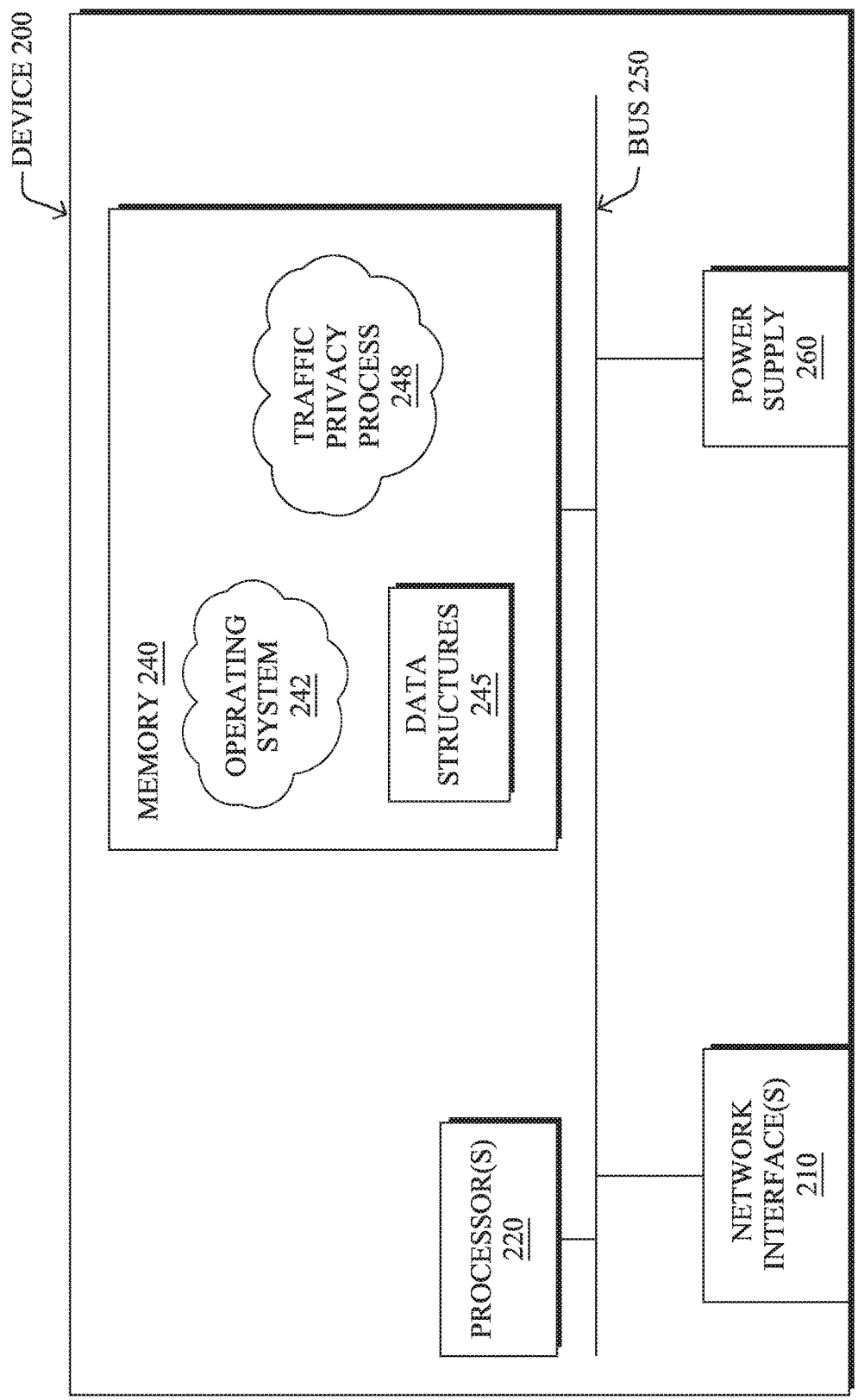
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic privacy process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, the use of encryption to encrypted network traffic is becoming increasingly ubiquitous. However, the proliferation of encrypted traffic is a double-edged sword increasing the privacy of the communications, on one hand, and also increasing security concerns, on the other hand. Indeed, encryption is now used by malicious entities for purposes of propagating malware and concealing malicious traffic flows such as data exfiltration-related flows, spyware and ransomware-related flows, command and control (C2) traffic flows that control the operation of deployed malware, and the like.

FIGS. 3A-3B illustrate example approaches to assess encrypted traffic in a network. FIG. 3A illustrates an example network 300 in which a man-in-the-middle approach is taken, in some embodiments. As shown, assume that a first endpoint 302 is to communicate with a second endpoint 304 via network 300. For example, endpoint 302 may be a personal computer (PC), laptop, tablet, cellular phone, smart watch, smart device, IoT device, senor, actuator, or any other type of device capable of communicating via network 300. Similarly, for purposes of illustration, endpoint 304 may comprise a server, data storage system, or any other form of computing device with which endpoint 302 may communicate.

In various embodiments, a man-in-the-middle service 308 may be located in network 300 along the communication pathway between endpoint 302 and endpoint 304. For example, man-in-the-middle service 308 may be executed on a switch, router, firewall, proxy, or any other intermediary device located between endpoint 302 and endpoint 304 in network 300. In a further embodiment, man-in-the-middle service 308 may even be located locally on endpoint 302, such as part of a local endpoint security service run on endpoint 302.

During operation, the main function of man-in-the-middle service 308 is to essentially 'trick' endpoints 302-304 into believing that they are each communicating directly with one another, thereby allowing man-in-the-middle service 308 to access the cleartext of their exchanged traffic 306. To do so, man-in-the-middle service 308 may intercept a key exchange request from traffic 306 send from endpoint 302 towards endpoint 304. Rather than allowing endpoint 304 to return its keying information back to endpoint 302, man-in-the-middle service 308 may instead substitute its own keying information into the exchange.

As a result of the insertion of man-in-the-middle service 308 into the key exchange process, endpoint 302 will encrypt its traffic 306 using the keying information supplied by man-in-the-middle service 308. This allows man-in-the-middle service 308 to then decrypt traffic 306 and assess the decrypted traffic 306 for maliciousness, associated application, or the like. For example, man-in-the-middle service 308 may ensure that traffic 306 does not include malware, C2C commands, exfiltrated data, or the like. Assuming that traffic 306 does not violate the security policies of man-in-the-middle service 308, man-in-the-middle service 308 may then re-encrypt traffic 306 into traffic 306a and exchange traffic 306a with endpoint 304. Thus, endpoint 302 communicates with man-in-the-middle service 308 while believing that it is communicating securely with endpoint 304. Conversely, endpoint 304 communicates with man-in-the-middle service 308, while believing that it is communicating securely with endpoint 302.

While a man-in-the-middle approach is quite favorable from a security standpoint, it is also highly disfavored from a privacy standpoint, as it exposes the cleartext of the encrypted traffic during transit. Indeed, the use of a man-in-the-middle service may even be illegal in some jurisdictions.

FIG. 3B illustrates another potential approach for assessing encrypted traffic in a network. Continuing the example of FIG. 3A, assume in FIG. 3B that endpoints 302-304 are allowed to exchange encrypted traffic 306 with each other and without an intermediary decrypting the traffic 306. To still assess traffic 306 for maliciousness, application identification, etc., telemetry data indicative of the characteristics of traffic 306 can be captured and provided to a network traffic analysis service 310.

In general, network traffic analysis service 310 may execute one or more machine learning-based classifiers to classify encrypted traffic 306 in network 300. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function is a function of the number of misclassified points. The learning process then operates by adjusting the parameters a,b,c such that the number of misclassified points is minimal. After this optimization/learning phase, network traffic analysis service 310 can use the model M to classify new data points, such as information regarding new traffic flows in the network. Often, M is a statistical model, and the cost function is inversely proportional to the likelihood of M, given the input data.

In various embodiments, network traffic analysis service 310 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that network traffic analysis service 310 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, network traffic analysis service 310 may assess the captured telemetry data regarding encrypted traffic 306 on a per-flow basis. In other embodiments, network traffic analysis service 310 may assess telemetry data for a plurality of traffic flows in traffic 306 based on any number of different conditions. For example, the traffic flows of traffic 306 may be grouped based on their sources, destinations, temporal characteristics (e.g., flows that occur around the same time, etc.), combinations thereof, or based on any other set of flow characteristics.

Example telemetry data regarding the encrypted traffic 306 for consumption by network traffic analysis service 310 may include any information that can be captured from the unencrypted header(s) of traffic 306. For example, network traffic analysis service 310 may base its classification in part on the source address and/or port of endpoint 302, the destination address and/or port of endpoint 304, the protocol(s) used by traffic 306. Further header information from traffic 306 that can be captured and assessed by network traffic analysis service 310 may include Transport Layer Security (TLS) information (e.g., from a TLS handshake), such as the ciphersuite offered, user agent, TLS extensions (e.g., type of encryption used, the encryption key exchange mechanism, the encryption authentication type, etc.), HTTP information (e.g., URI, etc.), Domain Name System (DNS) information, or any other data features that can be extracted from the observed traffic flow(s) of traffic 306.

In further embodiments, network traffic analysis service 310 may also assess statistics and/or metrics regarding traffic 306. For example, such information may include the start time, end time, duration, packet size(s), the distribution of bytes within a flow, etc., associated with the traffic flow by observing the packets of traffic 306. In more advanced cases, network traffic analysis service 310 may also assess sequence of packet lengths and time (SPLT) data regarding traffic 306, sequence of application lengths and time (SALT) data regarding traffic 306, and/or byte distribution (BD) data regarding traffic 306.

From a privacy standpoint, the network traffic analysis (NTA)-based approach illustrated in FIG. 3B is often viewed as preferable over the man-in-the-middle-based approach illustrated in FIG. 3A, as it does not actually decrypt traffic 306 and is less intrusive on its contents. However, this also makes the encrypted traffic subject to analysis anywhere along the pathway, which can still reduce the privacy of the communication.

Privacy Enhancing Man-In-The-Middle

The techniques herein introduce a man-in-the-middle based approach that actually enhances the privacy of encrypted traffic in a network by helping to defeat unwanted NTA-based assessment of the traffic. In some aspects, a man-in-the-middle service may coordinate with an endpoint of the traffic to insert padding bytes into the traffic, to help obfuscate the encrypted traffic from NTA. In further aspects, even if the endpoint does not support such functionality, the man-in-the-middle service may still help to prevent NTA along the pathway by adding additional frames to the traffic.

Specifically, according to one or more embodiments of the disclosure as described in detail below, a device in a network intercepts traffic sent from a first endpoint destined for a second endpoint. The device sends a padding request to the second endpoint indicative of a number of padding bytes. The device receives a padding response from the second endpoint, after sending the padding request to the second endpoint. The device adjusts the intercepted traffic based on the received padding response. The device sends the adjusted traffic to the second endpoint.

Illustratively, the techniques described herein may be performed by hardware, software, and/or firmware, such as in accordance with the traffic privacy process 248, which may include computer executable instructions executed by the processor 220 (or independent processor of interfaces 210) to perform functions relating to the techniques described herein.

Figure 4C:
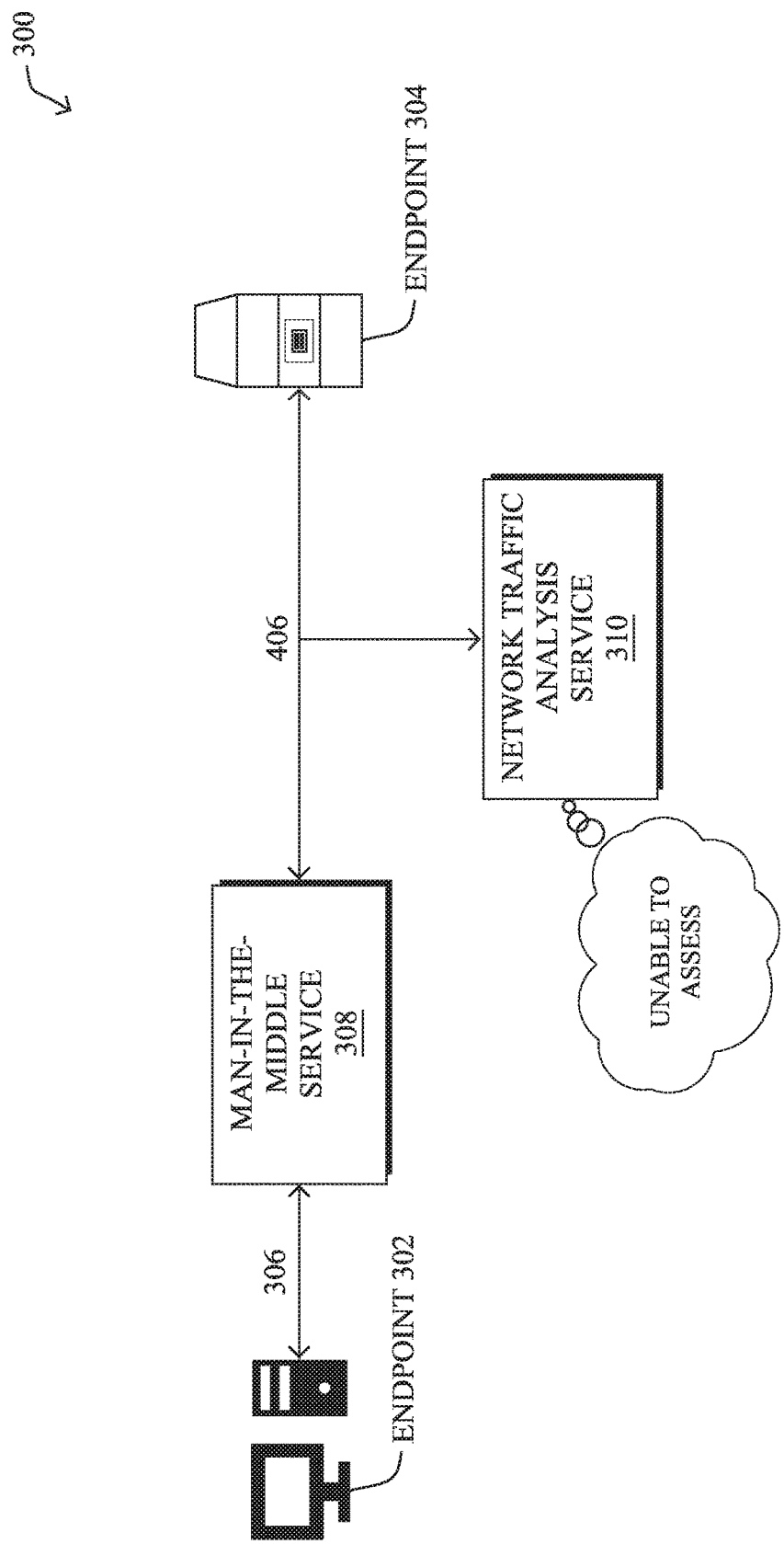

Operationally, FIGS. 4A-4C illustrate examples of a man-in-the-middle service ensuring traffic privacy, according to various embodiments. Continuing the examples of network 300 from FIGS. 3A-3B, assume in FIG. 4A that man-in-the-middle service 308 is configured to implement the techniques herein. As noted, man-in-the-middle service 308 may be provided by an intermediate networking device located in network 300 between endpoints 302-304 such as a router, switch, firewall, proxy, etc., or executed as a local service on endpoint 302, itself.

Testing of NTA systems has demonstrated that multiplexing over an encrypted session is, by far, the most robust defense against unwanted NTA. From this observation, some embodiments of the techniques herein propose that man-in-the-middle service 308 send extra frames (e.g., extra HTTP/2 frames, etc.) and/or bytes in a traffic stream, to obfuscate the sizes of the legitimate requests and responses, so as to defeat any unwanted NTA of the traffic 306.

As shown in FIG. 4A, assume that man-in-the-middle service 308 intercepts traffic 306 sent from endpoint 302 towards endpoint 304 and that endpoint 304 is what is referred to herein as 'cooperating,' that is, capable of implementing the techniques herein. After interception of the traffic 306, man-in-the-middle service 308 may send a padding request 402 in the form of a DUMMY frame to endpoint 304. In general, padding request 402 may include a "padding" field that indicates a number of bytes that man-in-the-middle service 308 wishes to add to traffic 306 from endpoint 302.

In response to receiving padding request 402, endpoint 304 may return a padding response 404 to man-in-the-middle service 308 that indicates a number of padding bytes that is less than, or equal to, the number of padding bytes requested by padding request 402. Optionally, padding response 404 can also include a "reason" field used to explain the byte size selected by endpoint 304, if any. For example, endpoint 304 may use the "reason" field to acknowledge padding request 402 and notify service 308 if there were any problems processing request 402, such as when service 308 requests too many bytes for the configuration of endpoint 304 (e.g., by including an 'ERR_MAX_BYTES_EXCEEDED' flag in the reason field of response 404). In some embodiments, to protect the negotiations, request 402 and padding response 404 exchanged between service 308 and endpoint 304 may be encrypted.

As shown in FIG. 4B, man-in-the-middle service 308 may adjust traffic 306 by inserting padding into traffic 306, based on padding response 404 from endpoint 304. For example, man-in-the-middle service 308 may insert extra HTTP/2 frames into traffic 306 or extra bytes into the existing frames, according to the padding byte value indicated by padding response 404, to form adjusted 406. In turn, man-in-the-middle service 308 may forward the adjusted traffic 406 to endpoint 304. In turn, endpoint 304 may ignore the additional padding added to traffic 406 by man-in-the-middle service 308.

As shown in FIG. 4C, the primary benefit of adjusting traffic 306 by adding padding bytes to it is that an NTA service located between man-in-the-middle service 308 and endpoint 304, such as service 310 shown, will no longer be able to discern the contents of the adjusted traffic 406. Indeed, by changing the overall size of the traffic 306, service 310 will be unable to discern its contents. To further protect against analysis by service 310, man-in-the-middle service 308 may also multiplex traffic 306 with additional traffic, in another embodiment.

In further embodiments, as would be appreciated, the privacy-enhancing techniques herein can also be implemented in a bi-directional manner. For example, endpoint 304 may pad its own traffic 406 destined for endpoint 302 using a number of bytes pre-negotiated with man-in-the-middle service 308. This amount of padding may be the same as the padding added by man-in-the-middle service 308 to traffic 306 or may be different, in various embodiments. Similar to endpoint 304, man-in-the-middle service 308 may strip any padding from the traffic 408 sent by endpoint 304, before forwarding the traffic on to endpoint 302.

Figure 5A:
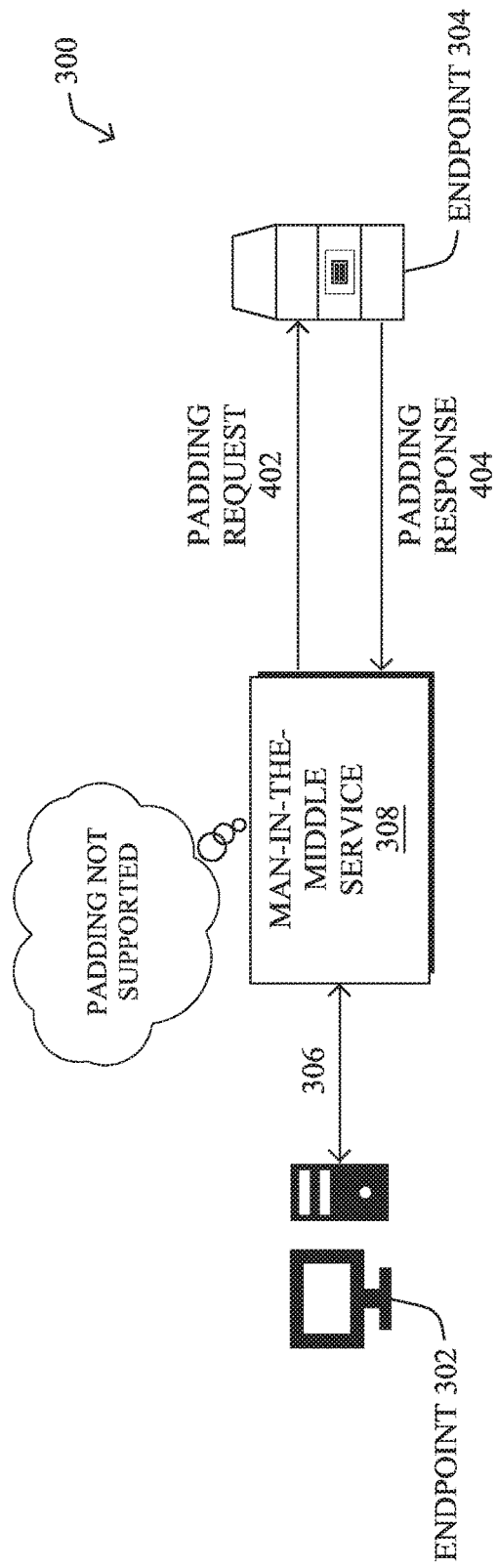
FIGS. 5A-5B illustrate an example of the service of FIGS. 4A-4C ensuring traffic privacy with a non-cooperating endpoint.
Figure 5B:
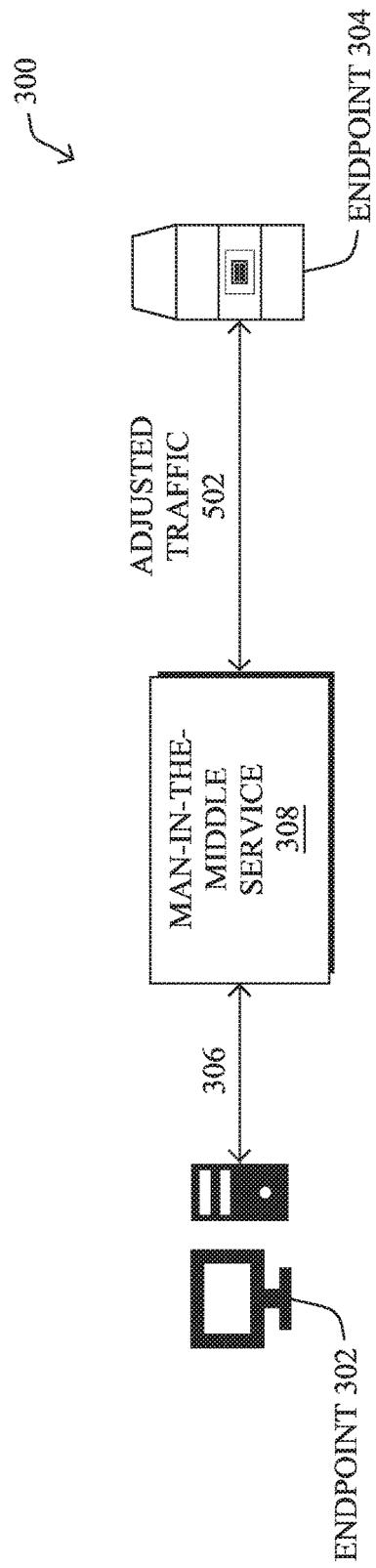

Ideally, endpoint 304 will always be a 'cooperating' server, meaning that it will support the padding operations of man-in-the-middle service 308. However, there are situations in which endpoint 304 may not support this functionality. FIGS. 5A-5B illustrate an example whereby endpoint 304 is a non-cooperating endpoint.

As shown in FIG. 5A, assume that man-in-the-middle service 308 intercepts traffic 306 sent by endpoint 302 and sends request 402 to endpoint 304, to negotiate an amount of padding to be added to traffic 306. However, for purposes of illustration, assume that endpoint 304 issues a padding response 404 that indicates that it cannot accommodate request 402. In some embodiments, this can be done explicitly. For example, padding response 404 may include a 'response' filed set to zero padding bytes and/or a 'reason' field indicating why it cannot accommodate request 402. In a further embodiment, this can also be done implicitly. For example, if man-in-the-middle service 308 does not receive an explicit padding response 404 from endpoint 304 within a threshold amount of time, man-in-the-middle service 308 may infer that endpoint 304 does not support the padding mechanism and is non-cooperating.

In various embodiments, man-in-the-middle service 308 may still obfuscate traffic 306 from NTA, even in the case of a non-cooperating endpoint. For example, as shown in FIG. 5B, if man-in-the-middle service 308 determines that endpoint 304 is a non-cooperating endpoint, man-in-the-middle service 308 may nonetheless adjust the encrypted traffic 306 sent by endpoint 302 by adding additional frames, before sending the adjusted traffic 502 on to endpoint 304. In such a case, the added frames may take the form of PING, SETTINGS, and/or WINDOWS_UPDATE frames that endpoint 304 will process, accordingly. In a further embodiment, man-in-the-middle service 308 may form adjusted traffic 502 by sending randomized HEADER frames, based on prior observations (e.g., previously used by endpoint 302), with the encrypted traffic 306 from endpoint 302. Of course, similar to the case in which endpoint 304 is cooperating, man-in-the-middle service 308 could also multiplex the traffic 306 from endpoint 302 with other traffic also destined for endpoint 304.

While the primary implementation envisions that man-in-the-middle service 308 is hosted at the edge of the local network of endpoint 302, such as on a firewall, router, etc., the techniques can also be implemented conceivably anywhere along the communication path (e.g., on a proxy) between endpoints 302-304. In the case of a proxy, it is also possible that HTTP traffic from multiple sources could be aggregated, prior to sending to endpoint 304, further enhancing privacy of the traffic.

In a further embodiment, as noted, the functionality of man-in-the-middle service 308 could also be implemented on endpoint 302 itself. For example, a web browser of endpoint 302 could be configured to negotiate with a cooperating server by sending a padding request to endpoint 304 and insert padding into its traffic, according to the response from endpoint 304.

Figure 6:
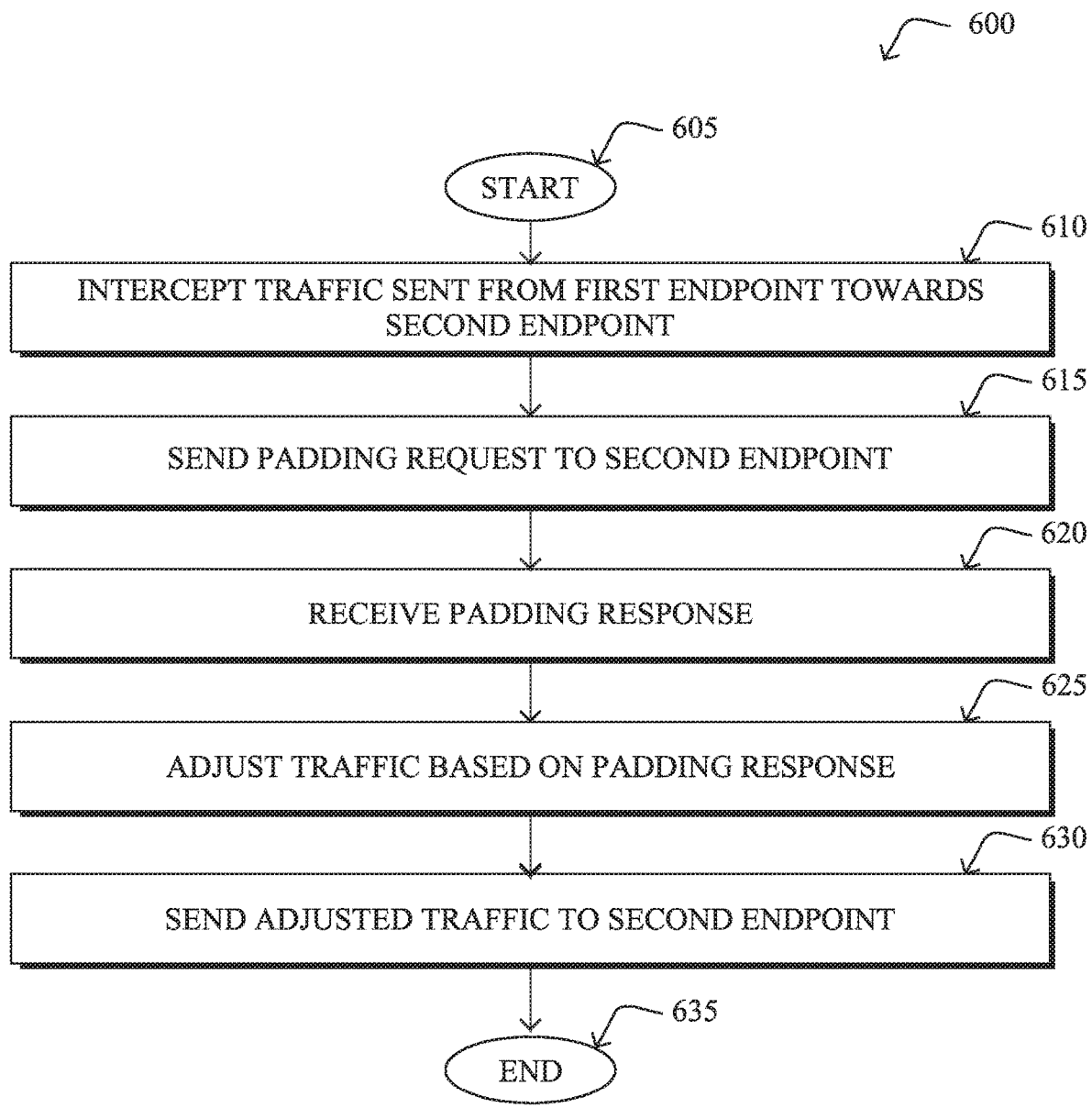
FIG. 6 illustrates an example simplified procedure for enhancing the privacy of network traffic.

FIG. 6 illustrates an example simplified procedure for enhancing the privacy of network traffic, in accordance with one or more embodiments described herein. For example, a non-generic, specifically configured device (e.g., device 200) that provides a monitoring service to a network, may perform procedure 600 by executing stored instructions (e.g., process 248). The procedure 600 may start at step 605, and continues to step 610, where, as described in greater detail above, the device may intercept traffic sent from a first endpoint destined for a second endpoint. In various embodiments, the device may comprise an intermediary networking device located between the endpoints, such as a router, switch, firewall, proxy, or the like. In further embodiments, the device may comprise the first endpoint itself. In some cases, the intercepted traffic may already be encrypted.

At step 615, as detailed above, the device may send a padding request to the second endpoint indicative of a number of padding bytes. Such a request may effectively initiate a negotiation between the device and the second endpoint for the use of padding of traffic exchanged between the device and the second endpoint. For example, the device may send a DUMMY frame to the second endpoint with a requested number of padding bytes to be used.

At step 620, the device may receive a padding response from the second endpoint, after sending the padding request to the second endpoint, as described in greater detail above. In some embodiments, the response may specify a number of padding bytes that is less than, or equal to, the number of padding bytes indicated in the padding request. In a further embodiment, the padding response from the server indicates that the second endpoint will not accommodate the padding request. For example, the padding response may include an indication that the number of padding bytes indicated by the padding request exceeds a maximum number of padding bytes supported by the second endpoint. In yet another embodiment, the padding response may simply comprise a lack of communication from the second endpoint within a threshold amount of time after the device sent the padding request.

At step 625, as detailed above, the device may adjust the intercepted traffic based on the received padding response. If, for example, the padding response from the second endpoint specifies a number of padding bytes, the device may adjust the intercepted traffic by padding frames of the intercepted traffic with a number of padding bytes specified by the received padding response. However, if the padding response from the second endpoint indicates that the second endpoint will not accommodate the padding request sent by the device, the device may adjust the intercepted traffic by adding one or more frames to the intercepted traffic comprising at least one of: a PING frame, a SETTINGS frame, or a WINDOWS_UPDATE frame. Alternatively, in a further embodiment, the device may adjust the intercepted traffic by adding randomized, previously observed headers sent by the first endpoint to the intercepted traffic.

At step 630, the device may send the adjusted traffic to the second endpoint, as described in greater detail above. If the device adjust the traffic by inserting padding bytes into the traffic, the second endpoint may, in turn, strip/remove the added padding from the traffic. Conversely, if the second endpoint is a non-cooperating endpoint, it may simply process the added PING, SETTINGS, WINDOWS_UPDATE, or header frames, as it would, normally. Procedure 600 then ends at step 635.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the enhanced privacy of network traffic by obfuscating the characteristics of the traffic to defeat any unwanted NTA along the communication pathway of the traffic. In some aspects, a man-in-the-middle located either on the sender or on a networking device along the pathway, may adjust the sent traffic, to add padding or other additional 'noise,' so as to change the characteristics of the traffic.

While there have been shown and described illustrative embodiments that provide for a privacy enhancing man-in-the-middle, it is to be understood that various other adaptations and modifications may be made within the spirit and scope of the embodiments herein. For example, while certain embodiments are described herein with respect to using certain models for purposes of classifying encrypted traffic, the models are not limited as such and may be used for other functions, in other embodiments. In addition, while certain protocols are shown, such as TLS, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
intercepting, by a device in a network, traffic sent from a first endpoint destined for a second endpoint;
sending, by the device, a padding request to the second endpoint indicative of a number of padding bytes;
receiving, at the device, a padding response from the second endpoint, after sending the padding request to the second endpoint;
adjusting, by the device, the intercepted traffic based on the received padding response; and
sending, by the device, the adjusted traffic to the second endpoint.

2. The method as in claim 1, wherein adjusting the intercepted traffic based on the padding response comprises:
padding frames of the intercepted traffic with a number of padding bytes specified by the received padding response, wherein the second endpoint removes the padding bytes from the padded frames.

3. The method as in claim 2, wherein the padding response specifies a number of padding bytes that is less than the number of padding bytes indicated in the padding request.

4. The method as in claim 1, wherein the intercepted traffic is encrypted.

5. The method as in claim 1, wherein the padding response from the server indicates that the second endpoint will not accommodate the padding request.

6. The method as in claim 5, wherein adjusting the intercepted traffic based on the received padding response comprises:
adding one or more frames to the intercepted traffic comprising at least one of: a PING frame, a SETTINGS frame, or a WINDOWS_UPDATE frame.

7. The method as in claim 5, wherein the padding response comprises an indication that the number of padding bytes indicated by the padding request exceeds a maximum number of padding bytes supported by the second endpoint.

8. The method as in claim 5, wherein the padding response comprises a lack of communication from the second endpoint within a threshold amount of time after the device sent the padding request.

9. The method as in claim 5, wherein adjusting the intercepted traffic based on the received padding response comprises:

adding randomized, previously observed headers sent by the first endpoint to the intercepted traffic.

10. The method as in claim 1, wherein the device comprises a proxy, router, or firewall.

11. An apparatus, comprising:
one or more network interfaces to communicate with a network;
a processor coupled to the network interfaces and configured to execute one or more processes; and
a memory configured to store a process executable by the processor, the process when executed configured to:
intercept traffic sent from a first endpoint destined for a second endpoint;
send a padding request to the second endpoint indicative of a number of padding bytes;
receive a padding response from the second endpoint, after sending the padding request to the second endpoint;
adjust the intercepted traffic based on the received padding response; and
send the adjusted traffic to the second endpoint.

12. The apparatus as in claim 11, wherein the apparatus adjusts the intercepted traffic based on the padding response by:

padding frames of the intercepted traffic with a number of padding bytes specified by the received padding response, wherein the second endpoint removes the padding bytes from the padded frames.

13. The apparatus as in claim 12, wherein the padding response specifies a number of padding bytes that is less than the number of padding bytes indicated in the padding request.

14. The apparatus as in claim 11, wherein the intercepted traffic is encrypted.

15. The apparatus as in claim 11, wherein the padding response from the server indicates that the second endpoint will not accommodate the padding request.

16. The apparatus as in claim 15, wherein the apparatus adjusts the intercepted traffic based on the received padding response by:

adding one or more frames to the intercepted traffic comprising at least one of: a PING frame, a SETTINGS frame, or a WINDOWS_UPDATE frame.

17. The apparatus as in claim 15, wherein the padding response comprises an indication that the number of padding bytes indicated by the padding request exceeds a maximum number of padding bytes supported by the second endpoint.

18. The apparatus as in claim 15, wherein the apparatus adjusts the intercepted traffic based on the received padding response by:

adding randomized, previously observed headers sent by the first endpoint to the intercepted traffic.

19. The apparatus as in claim 11, wherein the apparatus adjusts the intercepted traffic based on the received padding response by:

multiplexing the intercepted traffic with additional traffic.

20. A tangible, non-transitory, computer-readable medium storing program instructions that cause a device in a network to execute a process comprising:

intercepting, by the device in the network, traffic sent from a first endpoint destined for a second endpoint;
sending, by the device, a padding request to the second endpoint indicative of a number of padding bytes;
receiving, at the device, a padding response from the second endpoint, after sending the padding request to the second endpoint;
adjusting, by the device, the intercepted traffic based on the received padding response; and
sending, by the device, the adjusted traffic to the second endpoint.

* * * * *